Sept. 20, 1927.

S. A. SHELLER

HAND AND BAND SAW SIDE FILE

Filed Aug. 17, 1926

1,643,135

Inventor
S. A. Sheller
By Robb & Robb
Attorneys

Patented Sept. 20, 1927.

1,643,135

UNITED STATES PATENT OFFICE.

SAMUEL A. SHELLER, OF CLEVELAND, OHIO.

HAND AND BAND SAW SIDE FILE.

Application filed August 17, 1926. Serial No. 129,838.

This invention has to do with the art of filing saws and embodies primarily a simple and exceedingly effective side file useful primarily in side filing of hand and band saws. While it is known that side filing of saws of the above kinds is a desirable method of finally sharpening the saw, so far as I am aware, there has never been marketed any handy special side file for the special purpose referred to, since ordinarily, regular files are suggested as usable to do the side filing work but after many years of experience in doing saw filing work, I have found a special form of side file to be of peculiar advantage, and the present invention embodies such a device and comprises a construction which will appear more fully as this description proceeds.

For a full understanding of my invention and the merits thereof, reference is had to the accompanying drawings in which:—

Figure 1:
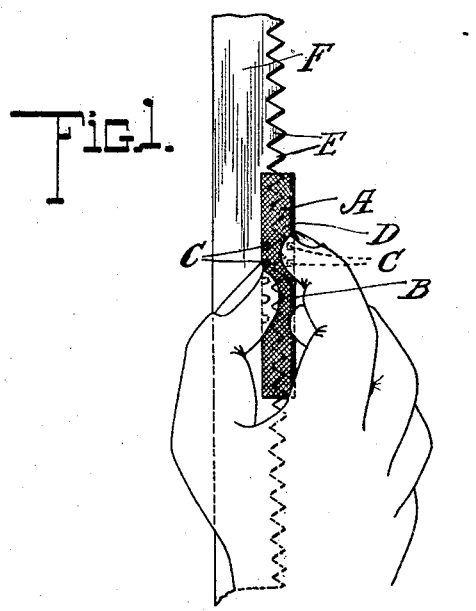
Figure 1 is a top plan view showing a side file embodying this invention as when applied to a saw in use.
Figure 2:
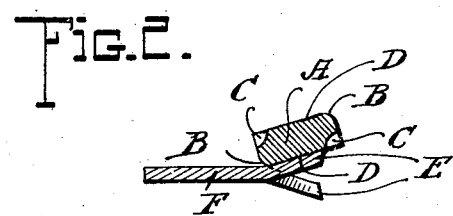
Figure 2 is a cross sectional view of the file taken about centrally therethrough.
Figure 3:
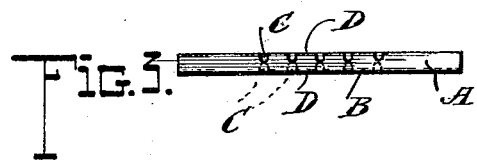
Figure 3 is an edge elevation of the article.

Presenting my invention in the specific form in which it is shown in the drawings, it is noted that it comprises a somewhat flat body A of approximately rectangular form in cross section, diagonally opposite corner portions of the file being rounded as shown at B, and the other diagonally opposite corner portions being formed each with a plurality of notches C. The body A of the file is relatively long and narrow though in actual practise the length may be approximately two inches and the width about a quarter of an inch with a thickness of approximately an eighth of an inch. Of course these particular measurements may not be used as they are not absolutely necessary and various dimensions of the file may be resorted to as desired or required under practical conditions of service. The opposite sides of the file are formed with the filing surfaces D which extend substantially the entire length of the file, the notches C being formed in the edge portion of the file provided with such filing surface and the edge opposite the notches at the other side of the filing surface designated D being smoothed and rounded as shown at B.

With the foregoing description of the form of my file in mind, the manner in which it is used may be set forth.

The file is placed upon the sides of the tooth of the saw with one of the filing surfaces D down against the tooth sides. Also the lower rounded corner edge B beneath the notches C which are uppermost is disposed to fit the angle formed by emerging of the saw tooth E with the body F of the saw. Such rounded edge B by fitting the said angle tends to hold the file in line with the teeth. Thereupon, the file is grasped between the thumb and the first two fingers, preferably, or at any rate, is subjected to the pressure of the thumb applied thereto on the notched portions which are uppermost and then the file is given a longitudinal movement relatively to the saw and while engaged with the upper sides of the teeth.

In the above manner, the set of teeth is evened and they are lined up. If the teeth are set too much, their set may be slightly reduced by one or two or three movements on the file along the sides thereof. If it is desired to sharpen the points of the teeth after they have been dulled, and assuming that the set of teeth is yet sufficient to make the saw efficient, the sharpening may be performed to revive the points by running the file one or two times along the sides of the teeth throughout the whole length of the saw, of course.

An even pressure should be exerted on the file in handling the same, and by reason of the provision of the filing surfaces D on the upper and lower sides of the saw, and the similar notches C in the upper and lower sides, it is obvious that the file is reversible at will so that it may be very quickly handled and so that its life is somewhat prolonged.

It will be apparent that my side file is extremely simple in its formation and may be produced at a very nominal cost of manufacture.

Having thus described my invention, what I claim as new and desire to secure by Letters Patent of the United States, is:—

1. As a new article of manufacture a side file for saws, consisting of a file body provided with side walls of substantially the same width as the teeth of a saw, and means intermediate the ends of the body to allow for the gripping of the file by the user in a manner that will prevent any slippage of the file as it is pushed along the sides of the teeth of a saw.

2. As a new article of manufacture a side file for hand, band and similar saws, consisting of a file body having side walls of substantially the same width as the teeth of a saw, and notches intermediate the ends of the file for gripping the file when in use.

3. As a new article of manufacture a side file for saws, consisting of a file having a substantially rectangular body with sides of substantially the same width as the teeth of a saw, said body being rounded at its edges, and notches on the file intermediate the ends thereof at diagonally opposite edges for gripping the file when in use.

In testimony whereof I affix my signature.

SAMUEL A. SHELLER.